SELECTIVE ELECTRONIC SIGNAL RECEIVING AND ACTUATING DEVICE

Filed Feb. 25, 1963

INVENTOR.
MARK W. HOUGH
BY
Rifand Gregory
ATTORNEYS

United States Patent Office 3,299,284
Patented Jan. 17, 1967

3,299,284
SELECTIVE ELECTRONIC SIGNAL RECEIVING AND ACTUATING DEVICE

Mark W. Hough, St. Paul, Minn., assignor to Liftronic, Inc., St. Paul, Minn., a corporation of Minnesota Filed Feb. 25, 1963, Ser. No. 260,724
2 Claims. (Cl. 307—88.5)

This invention relates to an improvement in an electronic control or actuating device. In the embodiment here disclosed, applicant's invention is indicated as being used in connection with a door opening apparatus, and more particularly in connection with a garage door opening apparatus. The door opening apparatus forms no part of the invention herein and may be of any desired conventional design.

It is desirable to have an electronic actuating device which will not be triggered by a random signal or by any signal except by a certain intended signal. Such devices have been triggered unintentionally as by power lawn mowers or household appliances in operation in the vicinity of the device.

It is an object of this invention therefore to provide an electronic actuating device which is free from false triggering by a random signal.

It is a further object of this invention to provide an electronic actuating device which is arranged and constructed to be locked out or made inactive by random signals and to be actuated only by a certain intended signal specifically given.

It is another object of this invention to provide an electronic actuating device which under the influence of a spectrum of noise such as white or raw noise is adapted to pick up a certain lockout frequency at a maximum amplitude and to pick up the actuating frequency, if present, at an amplitude no greater than that of said lockout frequency and preferably at a reduced amplitude to provide a signal strength between the two frequencies on the order of the ratio of 2:1 or greater.

More specifically it is an object of this invention to provide an electronic actuating device arranged and constructed to be actuated only when the intended actuating signal is given from the signal generating or transmitting means used in connection with said actuating device.

These and other objects and advantages of the invention will be fully set forth in the following description made in connection with the accompanying drawings in which like reference characters refer to similar parts throughout the several views and in which.

Figures 1, 2, 3:
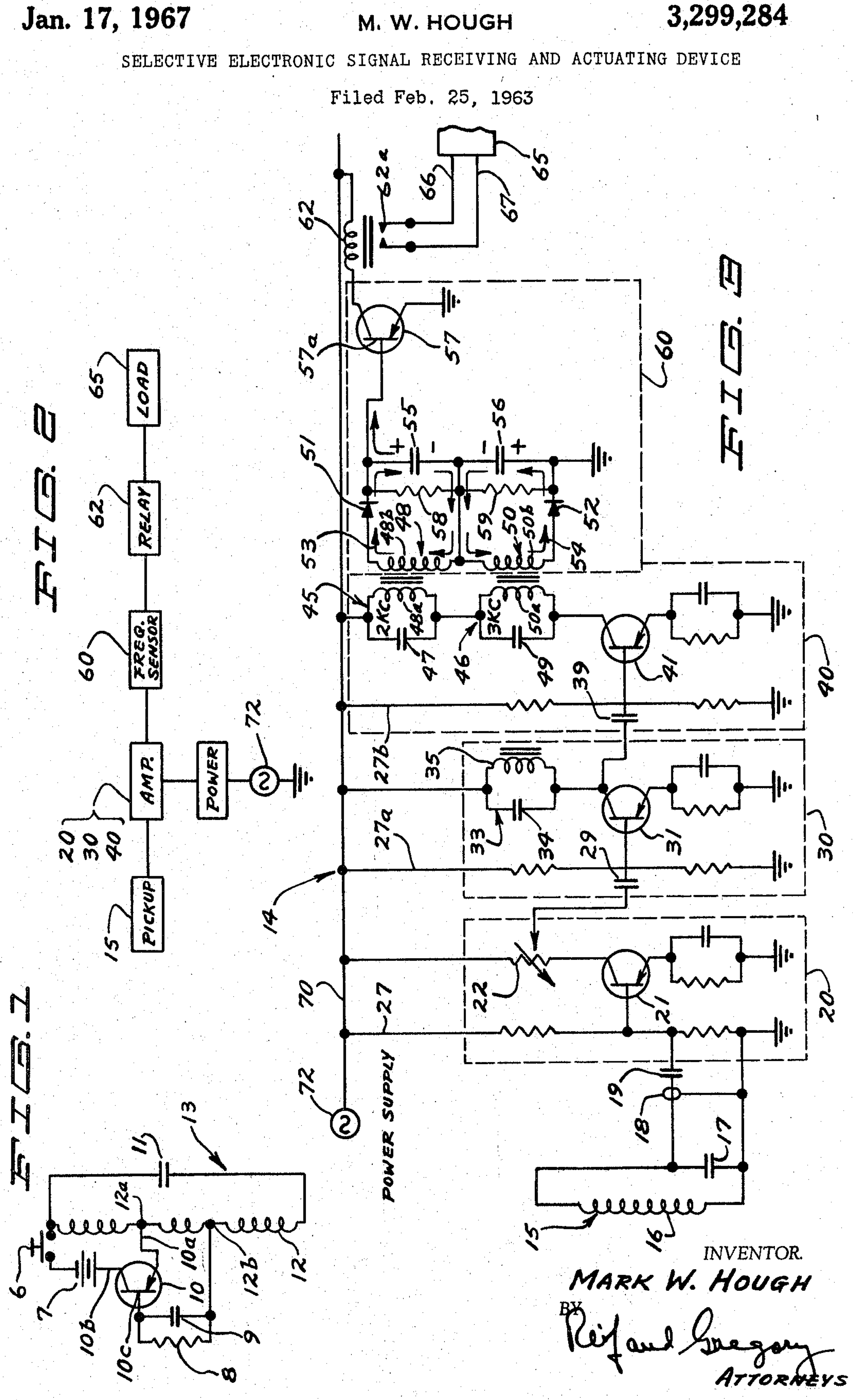
FIG. 1 is a wiring diagram of a signal transmitting device.
FIG. 2 is a block diagram showing of applicant's actuating device and a door opening apparatus indicated as a LOAD.
FIG. 3 is a schematic diagram of applicant's actuating device.

It will be understood that applicant's device may be formed in various specific ways.

Reference is had to the drawings, and more particularly to FIG. 3 wherein a schematic diagram is shown of applicant's device in a preferred embodiment comprising a transistorized electronic actuating or control device indicated generally by the character 14.

A pickup coil device 15 is shown of a conventional design comprising a coil 16 which will be wound as on a ferrite rod together with a capacitor 17 and will be designed to provide a low Q circuit which is here indicated as having a resonant frequency of approximately 2 kc. This pickup device in having relatively low Q characteristics will be broad enough to pick up substantial energy at 3 kc. These signal frequencies have been arbitrarily selected. For application in the embodiment of the invention here disclosed, said pickup coil is adapted to pick up a signal frequency of 2 kc. at a maximum amplitude or sensitivity and is adapted to pick up a signal frequency of 3 kc. at an amplitude or sensitivity which is attenuated. Although the signal frequencies of 2 kc. and 3 kc. may have equal signal strength or response ratio in the pickup ratio of applicant's device without false triggering occurring, as will hereinafter be explained, it has been found more desirable to provide a ratio of signal strength or of response ratio between the signal frequencies of 2 kc. and 3 kc. on the order of 2:1 or more. The 2 kc. signal frequency is set up and designated as a lockout or non-actuating frequency, as will hereinafter be described. The 3 kc. signal frequency is set up and designated as an operating, triggering or actuating frequency. As used herein said pickup coil will be buried as adjacent the driveway leading to the garage door and a cable shield 18 is indicated in connection with the lines used.

Said pickup coil 15 is coupled to a three stage amplifier with the respective amplifier stages being indicated by the characters 20, 30 and 40. Said pickup coil 15 is coupled by a capacitor 19 to the first amplifier stage 20 which is a conventional grounded emitter type of amplifier biased for D.C. stability and bypassed for A.C. gain and comprising a PNP type of transistor 21 in connection with a potentiometer 22. Transistors of the same type are used throughout applicant's device.

The amplifier stage 20 is coupled to the amplifier stage 30 by capacitor 29 and includes a transistor 31. Said amplifier stage 30 is similar in design to the amplifier stage 20 with the exception that the collector load of the transistor 31 comprises an LC circuit 33 comprising a capacitor 34 and a coil 35 and forms a low Q broad band circuit having the same electrical characteristics as the pickup device 15 in being sufficiently broadly tuned to pass a signal frequency of 2 kc. at a maximum amplitude and a signal frequency of 3 kc. with amplitude attenuated.

A capacitor 39 couples the amplifier stage 30 with the third amplifier stage 40 with amplifier stage 40 comprising a transistor 41 and being similar in design to the first amplifier stage 20 with the exception of its collector load comprising two similar LC circuits 45 and 46 in series. The circuit 45 will be sharply tuned to pass a signal frequency of 2 kc. and the circuit 46 will be sharply tuned to pass a signal frequency of 3 kc.

In connection with the LC circuit 45 is a capacitor 47 and a primary coil **48*a* having a secondary coil 48*b* in connection therewith and said coils being indicated generally by the character 48. In connection with the LC circuit 46 is a capacitor 49 and a primary coil 50*a* having a secondary coil 50*b* in connection therewith and said coils being indicated generally by the character 50. Said coils will be so designed that the A.C. voltage across the secondary coils 48*b* at a frequency of 2 kc. will be twice the A.C. voltage across the secondary coils 50*b*** at a frequency of 3 kc.

Present in each of said amplifier stages are base bias resistor circuits 27, **27*a* and 27*b*** respectively as conventionally used.

The voltage across the secondary of the coils 48 is rectified by diode 51 and becomes a pulsating D.C. signal through the circuit path 53 with the current flow being in a positive direction in connection with a capacitor 55 to transistor 57 and applying a positive voltage to the base **57*a* of said transistor 57**. Said base of said transistor is designed to be biased off with the application of a positive voltage.

The voltage across the secondary of the coils 50 is rectified by the diode 52 and becomes a pulsating D.C. signal through the circuit path 54 with the current flow being in a negative direction in connection with the capacitor 56 applying a negative voltage to the base 57*a* of said transistor 57. This current flow is in a direction opposite that of the current flow in the current path 54. Included in the circuits forming the current paths 53 and 54 are resistors 58 and 59 respectively.

The secondary of the coils 48 and 50 together with the diodes 52 and 53, the resistors 58 and 59, and the capacitors 55 and 56 in connection with the transistor 57 form a frequency sensor stage 60.

In circuit with said transistor 57 is a relay 62 comprising contacts 62*a* having lead wires 66 and 67 running therefrom to a garage door opening mechanism here indicated merely by a block diagram and referred to generally as load 65.

All of the circuitry herein will be suitably grounded as indicated and will have lead wires running to a line 70 connected to a suitable power supply 72.

Referring now to FIG. 1, reference is had to the signal generating apparatus or transmitter 13 which will be mounted in the motor vehicle of the operator. Said apparatus forms a conventional transistor oscillator circuit and comprises a coil 12 having taps 12*a* and 12*b*, with said coil being coupled at either end with a resonant capacitor 11. Said coil at one end is connected to a button switch 6 through which connection is made with a battery 7. A transistor 10 is provided for a current controlling element having its collector 10*b* running to said battery and its emitter 10*a* connected to the tap 12*a* of said coil. The base 10*c* of said transmitter runs to the tap 12*b* of said coil having in connection therewith a biasing resistor 8 and a biasing capacitor 9 forming a base driving circuit.

Said transmitter 13 will be constructed to put out a strong signal which in connection with the embodiment disclosed herein is a signal having a frequency of 3 kc. This has been designated as an actuating signal. At a signal frequency of 2 kc. a signal will also be put out and this has been designated as a lockout signal. However the signal strength of said lockout signal as here put out will be negligible and in effect therefore a substantially pure 3 kc. signal frequency is emitted by said transmitter to be picked up by the pickup coil device 15 and by the amplifying system and frequency sensor system in connection therewith.

OPERATION

Applicant's control device is intended to be actuated by the signal transmitter 13 mounted in the operator's motor vehicle. The actuating signal put out as indicated will have a frequency of 3 kc. which has been designated as the actuating frequency in connection with the control device 14. At a signal frequency of 2 kc. the transmitter 13 puts out a signal frequency which is negligible for all practical purposes herein.

The pickup coil device 15 picks up the 3 kc. signal frequency emitted by the transmitter and which in effect as described is practically a pure signal and this is passed by the amplifier system with a large A.C. voltage being developed across the coils 50 with the current being rectified by the diode 52 and passing over the current path 54 and applying a negative voltage to the base 57*a* of the transistor 57 thus biasing or energizing the transistor 57 to become conductive. Current flowing through said transistor energizes the relay 62 to actuate or cause the operation of the load 65 which in the present application is represented as being a garage door opener.

The problem of false triggering of an actuating device such as the applicant's arises from the presence of raw or white noise where within the spectrum of sound or signal frequencies which may be present with such noise there may be included the intended signal frequency for actuating the device.

Applicant very successfully avoids such false triggering. As above described, in connection with a band of raw or white noise, the pickup coil device 15 is adapted to pick up the lockout signal frequency of 2 kc. at a maximum amplitude and the triggering or actuating signal frequency of 3 kc. at an attenuated amplitude. It is noted here that there will be no false triggering as long as the lockout signal frequency is picked up at least at an equal signal strength relative to the actuating signal frequency. It is preferable however for the ratio of signal strength between the signal frequency 2 kc. and the signal frequency 3 kc. as picked up to be on the order of 2:1 or more. As is evident from the design of applicant's device as here described, with a signal ratio on the order of 2:1 at the point of the pickup coil device 15, this ratio will increase to be on the order of 8:1 at the point of the secondary coils.

The signal frequencies picked up by the pickup coil device 15 will be amplified by the first amplifier stage 20 and passed to the second amplifier stage 30 through the capacitor 29.

Said second amplifier stage 30 comprises an LC circuit 33 having the same electrical characteristics as the pickup coil device 15 passing the signal frequency of 2 kc. at a maximum amplitude and the signal frequency at 3 kc. at an attenuated amplitude. Said second amplifier state as indicated acts as a broadly tuned filter with a natural resonance frequency corresponding to that of the pickup coil device 15. The capacitor 39, couples the amplifier stage 30 with the third amplifier stage 40, which amplifier stage has two parallel tuned LC circuits 45 and 46 in series in the collector load of the transistor 41. Said LC circuits 45 and 46 are respectively tuned to signal frequencies of 2 kc. and 3 kc. Thus the signal frequencies amplified by amplifier stage 30 are applied to the two LC circuits in series, the circuit 45 being tuned to the lockout signal frequency of 2 kc. and the circuit 46 being tuned to the triggering or actuating signal frequency of 3 kc.

Relative to the signal frequencies passed, the LC circuit 45 represents a high impedance to the signal frequency of 2 kc. and a low impedance to the signal frequency of 3 kc., and the LC circuit 46 represents a high impedance to the signal frequency of 3 kc. and a low impedance to the signal frequency of 2 kc. The A.C. voltage developed across the coils 48 at 2 kc. will be twice that developed across the coils 50 at 3 kc.

From any band of raw or white noise, the 2 kc. signal frequency will be selected to be the strongest signal frequency and all other signal frequencies present for practical purposes will be negligible as to having any appreciable effect. The 2 kc. signal frequency in the instant disclosure will override a 3 kc. signal frequency which may be picked up from said band of noise by a substantial ratio.

Thus the 2 kc. signal frequency in passing across the coils 48 is rectified by the diode 52 and becomes a pulsating D.C. signal through the circuit path 53 with the current flow being in a positive direction through the capacitor 55 in connection with the resistor 58 to apply a positive voltage to the base of said transistor 57 biasing said transistor to an Off condition and in effect causing said transistor to become a lockout switch with no current flowing therethrough.

The voltage of any 3 kc. signal present in any band of raw or white noise will pass across the coils 50 over the current path 54 in a direction reverse of said current flow along the path 53 to apply a negative voltage or bias to the base 57*a* of said transistor 57 tending to bias or energize the transistor 57 to become conductive, but in view of said substantially greater positive voltage applied to said base 57*a*, the negative voltage applied will not be sufficient to override said voltage of said 2 kc. signal frequency and thus said transistor 57 continues to be biased in an Off condition.

Thus there is provided a predominant lockout signal frequency of 2 kc. which will override the triggering signal frequency of 3 kc. from any band of white or raw noise and effectively prevent false triggering of the actuating device 14.

Where the triggering signal frequency is emitted by the signal transmitter 13, for all practical purposes an almost pure signal frequency of 3 kc. is emitted with any signal frequency of 2 kc. emitted being negligible, whereby the 3 kc. signal frequency in passing along the current path 54 has adequate negative voltage to override any positive voltage present in the current path 53 and thus will bias or energize the transistor 57 to become conductive. A very small signal frequency of 2 kc. will pass along the current path 53 and it will have no appreciable effect as to biasing the transistor 57 to a non-conductive condition in view of the positive voltage present.

As indicated, when the triggering signal frequency of 3 kc. is emitted by the transmitter 13, the transistor 57 conducts current to actuate a relay 62 which in turn causes the operation of the Load 65 which may be in the form of any conventional door opening apparatus.

Thus it is seen that I have provided a simple and effective actuating device which is free from false triggering resulting from random noises.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. With respect to raw noise, an electronic selective signal receiving device having in combination, a pickup coil tuned to pick up at a maximum signal strength a lockout signal frequency and to pick up at a reduced signal strength an operating signal frequency, signal amplifying means forming parallel circuits, said circuits respectively comprising, a first amplifying stage comprising a transistor in connection with a potentiometer forming a grounded emitter type of amplifier biased for D.C. stability and bypassed for A.C. gain, a second amplifying stage consisting of a transistor having a collector load comprising a capacitor and an induction coil forming a low Q broad band circuit adapted to have the signal characteristics of said pickup coil, a third amplifying stage consisting of a transistor having a collector load comprising a pair of similar LC circuits in series, said LC circuits each comprising a capacitor and a primary coil in connection with a secondary coil, a capacitor coupling said pickup coil and said first amplifier stage and capacitors respectively coupling said amplifier stages, one of said LC circuits being sharply tuned to pass said lockout signal frequency, the other of said LC circuits being sharply tuned to pass said operating signal frequency, said one of said LC circuits being adapted to pass said lockout signal frequency at a voltage greater than the voltage applied to said operating signal frequency by said other of said LC circuits, a transistor having a base adapted to be biased to be non-conductive by a positive voltage, means rectifying said voltages across said secondary coils, the voltage from said secondary coil of said one of said LC circuits being adapted to flow in a positive direction through a circuit path including said last mentioned transistor and applying a positive voltage to the base thereof, the voltage from said secondary coil in connection with said other LC circuit being adapted to flow in a negative direction through a circuit path including said last mentioned transistor applying a negative voltage to the base thereof, and said circuit paths respectively comprising capacitors and resistors in connection with said last mentioned transistor.

2. The structure set forth in claim 1, said LC circuits respectively being adapted to pass a voltage across their secondary coils whereby the ratio of the voltage of said lockout signal frequency relative to the voltage of said operating signal frequency is on the order of 8:1.

References Cited by the Examiner

UNITED STATES PATENTS

| | | | |
|---|---|---|---|
| 2,773,181 | 12/1956 | Singel | 329—141 |
| 2,935,731 | 5/1960 | Richter | 317—147 |
| 3,133,252 | 5/1964 | Skolnick et al. | 340—171 |

JOHN W. HUCKERT, *Primary Examiner.*

J. D. CRAIG, *Assistant Examiner.*